United States Patent [19]

Stokes, Sr. et al.

[11] Patent Number: 5,197,173

[45] Date of Patent: Mar. 30, 1993

[54] METHOD FOR RECLAIMING INTERNAL PIPE MINERAL BUILDUP

[76] Inventors: Bennie R. Stokes, Sr., 114 N. Gulf Blvd., Freeport, Tex. 77541; Michael L. Hartmann, 127 Otter Trail, Lake Jackson, Tex. 77566

[21] Appl. No.: 832,356

[22] Filed: Feb. 7, 1992

[51] Int. Cl.[5] .............................................. B23D 79/00
[52] U.S. Cl. ................................. 29/81.021; 29/403.3; 83/870
[58] Field of Search ............... 29/81.02, 81.021, 81.13, 29/81.16, 403.1, 403.3, 415; 83/27, 54, 870, 874; 72/39, 40

[56] References Cited

U.S. PATENT DOCUMENTS

| | | | |
|---|---|---|---|
| 3,715,941 | 2/1973 | Andrews et al. | 83/7 |
| 3,851,552 | 12/1974 | English et al. | 83/870 |
| 4,076,062 | 2/1978 | Kanik | 144/193 A |
| 4,103,724 | 8/1978 | Braid | 144/193 A |
| 4,131,005 | 12/1978 | Pridy | 29/81.021 |
| 4,160,398 | 7/1979 | Bichot et al. | 83/865 |
| 4,412,570 | 11/1983 | Nickerson | 144/193 A |
| 4,534,254 | 8/1985 | Budizich et al. | 29/403.3 X |
| 4,628,894 | 12/1986 | Stewart | 83/870 X |
| 4,809,566 | 3/1989 | Campanella | 29/403.3 X |
| 4,957,022 | 9/1990 | Harris | 83/16 |

Primary Examiner—Mark Rosenbaum
Assistant Examiner—S. Thomas Hughes
Attorney, Agent, or Firm—Jacobson, Price, Holman & Stern

[57] ABSTRACT

Short pipe sections having mineral material deposit buildup therein are forced toward and upon a diametric wedge-type blade by a hydraulic ram, there being provided a guide for maintaining proper orientation of the pipe section being cut between the ram and the cutting blade.

6 Claims, 3 Drawing Sheets

METHOD FOR RECLAIMING INTERNAL PIPE MINERAL BUILDUP

BACKGROUND OF THE INVENTION

1. Field of the Invention

This invention relates to an apparatus and method for safely and economically removing a hardened buildup of mineral material, such as magnesium, from pipe sections constructed of bendable material such as steel.

2. Description of Related Art

Various different methods of removing hardened mineral buildup from the interior of pipe sections heretofore have been used. However, these various methods have not been proven economically feasible or safe when the material buildup to be removed comprises magnesium and the pipe sections from which the magnesium is to be removed are constructed of steel.

Conventional methods of cutting steel pipe sections into shorter lengths (without distorting the pipe sections) include torch cutting and high speed cross sawing, but both of these methods may not be used (even with a liquid coolant) in conjunction with magnesium. Accordingly, it has been found that "cold cutting" similar to that accomplished by a milling machine may be safely used to cut through pipe having a buildup of magnesium therein. Such "cold cutting" does not generate sufficient heat to ignite the magnesium and appreciably reduces the amount of magnesium dust formed during the cutting operation (as opposed to high speed saw cutting).

SUMMARY OF THE INVENTION

The method and apparatus of the instant invention involves the utilization of slow blade speed, "cold cutting" of steel pipe sections into shorter lengths and subsequently cutting the walls of the pipe sections along radial planes thereof spaced about the pipe sections.

In addition, the forming of radial plane cuts by a milling machine-type of operation in a pipe section wherein multiple radial plane cuts may be made in the pipe section from the exterior thereof allows the pipe section to be "cold cut" longitudinally, and the pipe section to be cut into pipe segments along radial planes of the pipe section also may be longitudinally advanced (by hydraulic ram) against a diametrically disposed blade (wedge-type) whereby the pipe section, and the magnesium buildup therein, is cut along a diametric plane of the pipe section, the cutting action of the wedge-type blade on the pipe section serving not only to cut the pipe section into pipe segments, but also to longitudinally arc the cut pipe segments and to cause the cut edge portions of the cut type segments to be rendered wavy, the wavy cut edges and the arcing of the cut pipe segments serving to automatically loosen the buildup of magnesium from the inner surfaces of cut pipe segments in a manner such that the magnesium buildup substantially fully falls away from the inner surfaces of the cut pipe segments. Thereafter, magnetic sorting means may be used to magnetically sort the cut steel pipe segments from the magnesium buildup separated therefrom.

The main object of this invention is to provide a method and apparatus for safely and efficiently reclaiming steel pipe sections and magnesium buildup which has occurred within the steel pipe sections.

Another object of this invention is to provide a method and apparatus which may be carried out through the utilization of relatively simple machinery and practiced by relatively unskilled work persons.

Another very important object of this invention is to provide a method and apparatus for separating and reclaiming steel pipe sections and the buildup of magnesium within the steel pipe sections, all without excess formation of magnesium dust.

A final object of this invention to be specifically enumerated herein is to provide an apparatus in accordance with the preceding objects and which will conform to conventional forms of manufacture, be of simple construction and easy to use so as to provide a device that will be economically feasible, long-lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENTS

Figure 1:
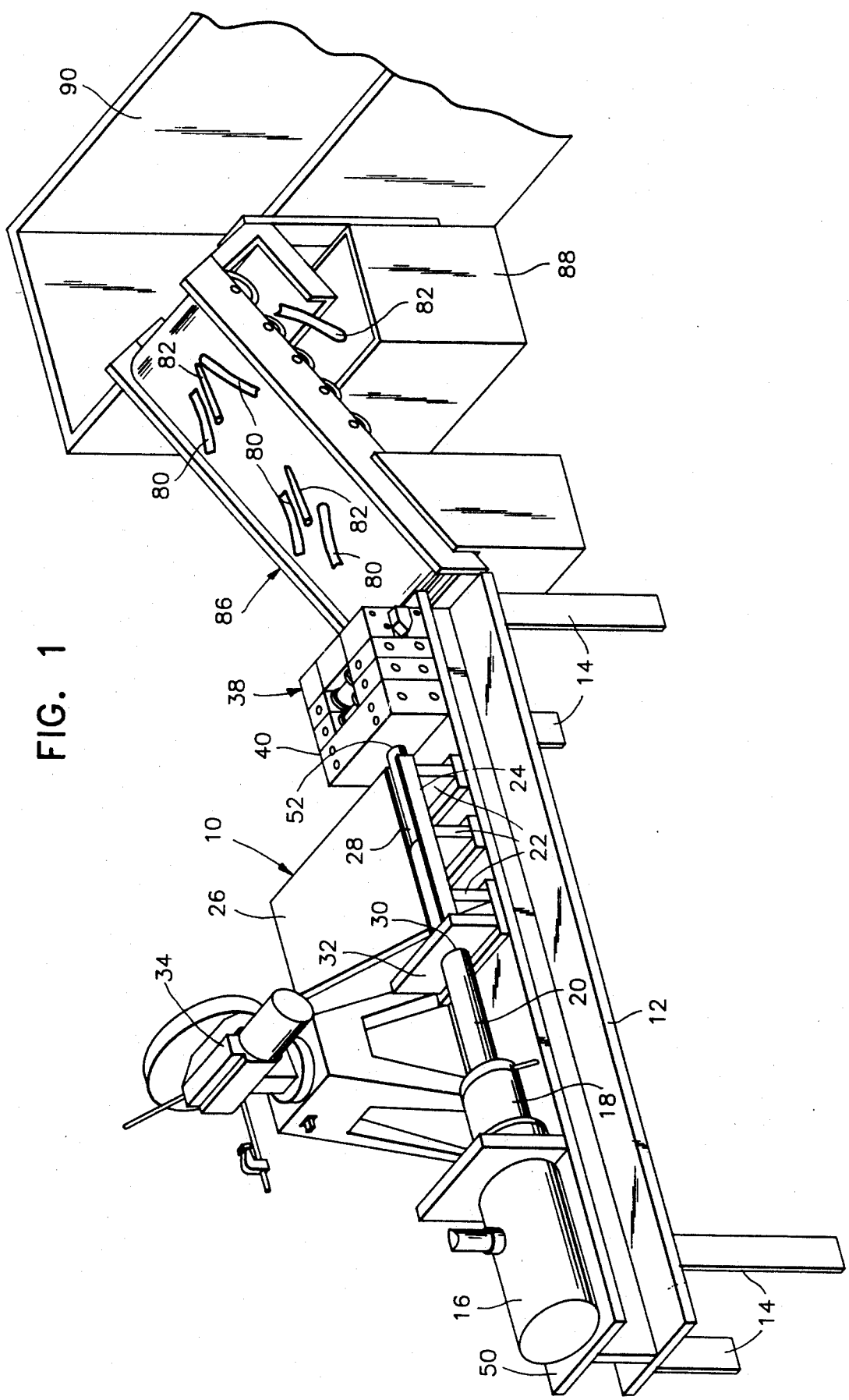
FIG. 1 is a perspective view of an apparatus constructed in accordance with the present invention for longitudinally cutting steel pipe sections along diametric planes thereof.

Referring now more specifically to the drawings the numeral 10 generally designates an apparatus constructed in accordance with the present invention for longitudinally cutting pipe sections.

The apparatus 10 includes a horizontal base 12 in the form of a heavy I-beam and the base 12 includes a plurality of support legs 14.

A hydraulic ram 16 is supported from one end of the beam 12 and includes an extendable and retractable piston 18 having a reduced diameter extension 20 on its free end. A plurality of supports 22 are mounted from the end portion of the beam 12 remote from the ram 16 and support an upwardly elongated trough 24 therefrom, the trough 24 being disposed at the lower end of a lateral, inclined chute 26 provided for feeding pipe sections 28 into the trough 24.

The extension 20 extends through a guide opening 30 formed in a guide plate 32 also supported from the I-beam base 12 and a gear drive cut off saw 34 is positioned adjacent the upper end of the chute 26 for slow, transverse "cold cutting" of lengths of steel pipe into short pipe sections such as the section 28.

Figure 2:
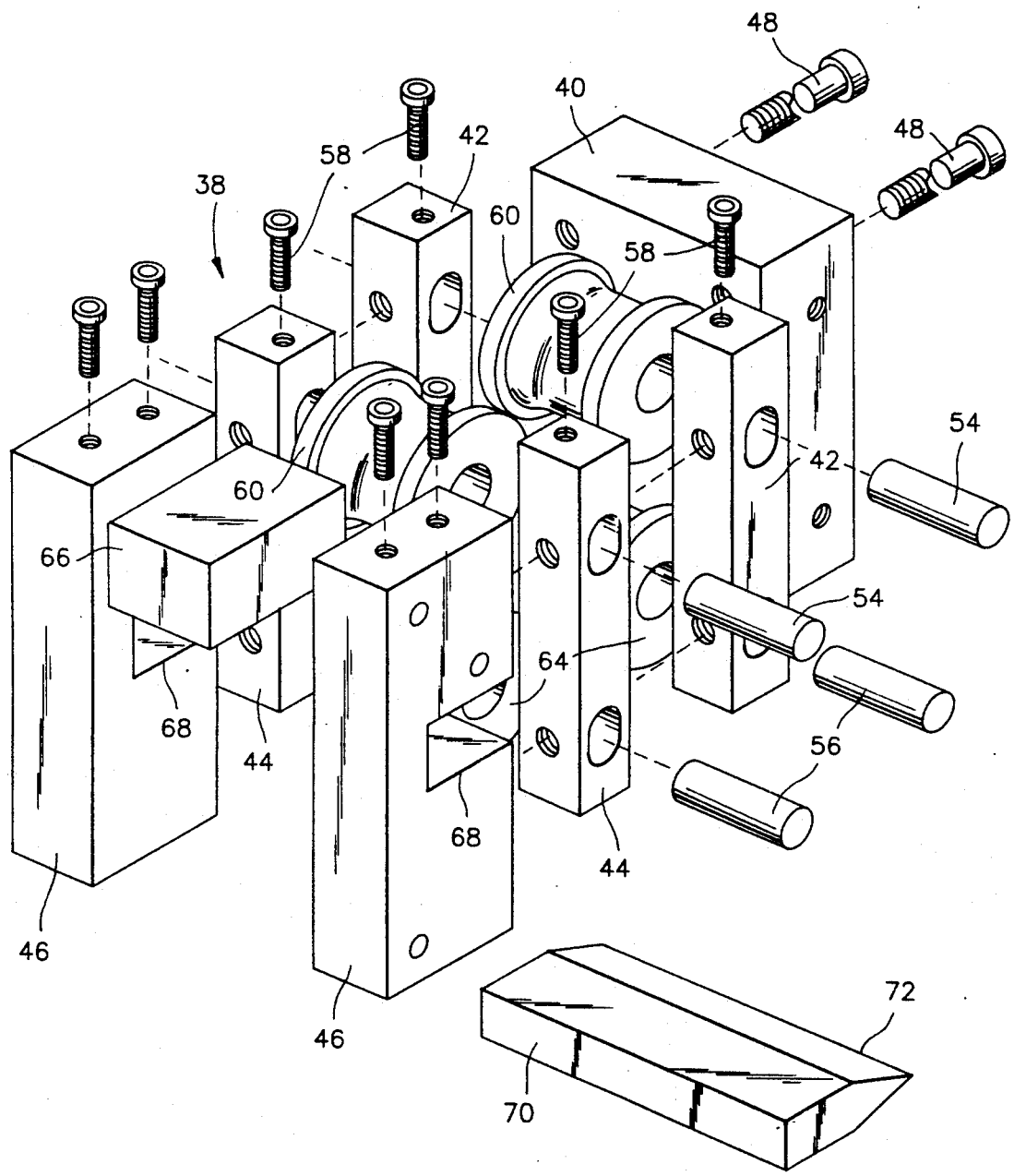
FIG. 2 is an enlarged, exploded perspective of the pipe cutting portion of the apparatus.
Figure 3:
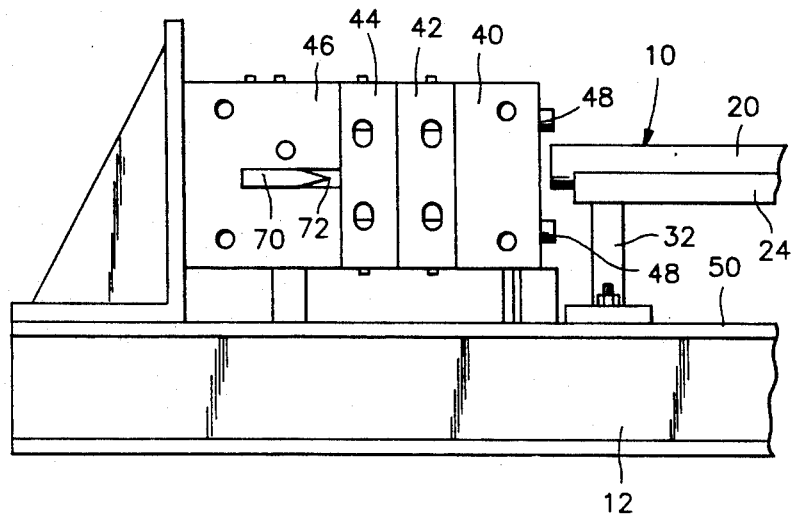
FIG. 3 is a side elevational view of that portion of the invention whose function it is to longitudinally cut the pipe sections advanced there toward.

With reference now more specifically to FIG. 2 of the drawings, the cutter assembly of the apparatus 10 is referred in general by the reference numeral 38 and includes a plurality of vertically oriented plates 40, 42, 44 and 46 secured together through the utilization of bolts 48 and anchored relative to the upper flange 50 of the beam 12 in any convenient manner.

The plate 40 has a guide opening 52 formed centrally therethrough for guidingly receiving the pipe section 28 into the interior of the cutter assembly 38 and the plates 42 and 44 shiftably support upper and lower pairs of axle shafts 54 and 56 therefrom for guided vertical shifting relative to the plates 42 and 44, the plates 42 and 44 including set screws 58 for adjustably limiting upward shifting of the shafts 54 and the shafts 54 and 56 having grooved guide rollers 60 and 64 journaled thereon between the plates 42 and 44.

A connecting block 66 is disposed between upper ends of the plates 46 and the latter include horizontal notches 68 formed therethrough in which the opposite ends of a wedge-type cutting blade 70 are seated, the blade 70 including a horizontal cutting edge 72 facing toward the rollers 60 and 64 and the plate 40 with the guide opening 52 therein.

The lengths of pipe from which the pipe sections 28 are cut by saw 34 may be substantially clogged with a buildup of magnesium therein. The pipe lengths are cut into shorter pipe sections by saw 34 utilizing the "cold cutting" process hereinbefore referred to and the individual pipe sections 28 roll down the chute 26 and are received within the trough 24. Thereafter, the ram 16 is actuated to extend the piston 18 thereof and the extension 20 mounted thereon with the extension 20 being guidingly received through the guide opening or bore 30 formed in the guide plate 32. Further, the extension 20 is received within the adjacent end of the trough 24 and thereafter engages the pipe section 28 and forces the latter through the guide opening 52 in the plate 40, between the pairs of rollers 62 and 64 and into engagement with the cutting edge 72 of the blade 70.

Figure 4:
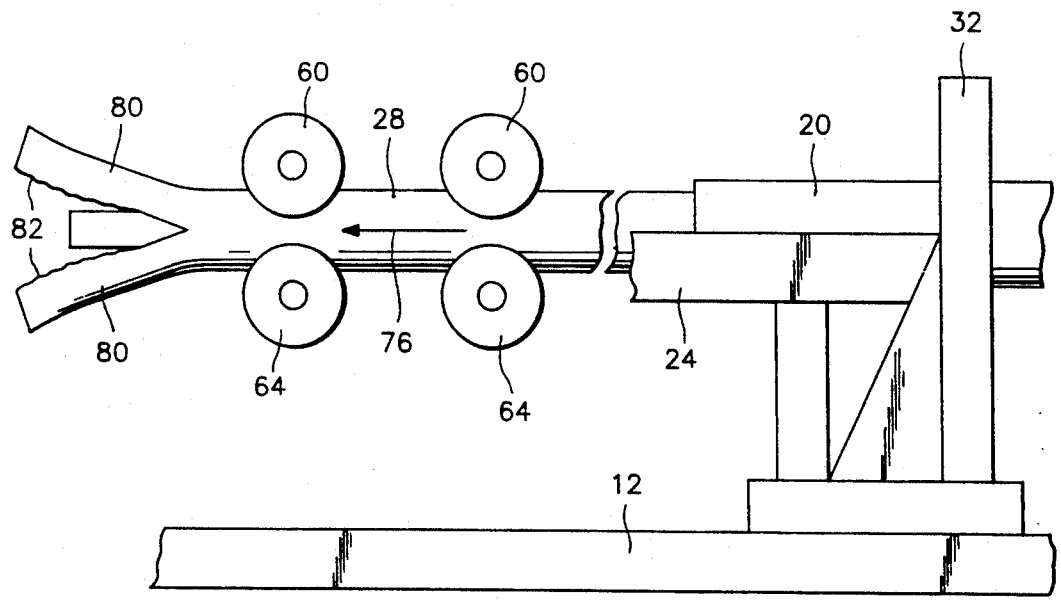
FIG. 4 is an enlarged side elevational schematic view illustrating the manner in which a pipe section to be cut is longitudinally forced between guide rollers and toward the diametric wedge-type cutting blade of the instant invention and the pipe segments formed by the cutting action have waves formed in the cut edges thereof and are longitudinally arched by the wedging action of the cutting blade on the pipe section.

With attention invited more specifically to FIG. 4, as the pipe section 28 is forced in the direction of the arrow 76 against the cutting edge 72 of the blade 70, the pipe section 28 is split into semi-cylindrical pipe section segments 80 and the cutting action on the pipe section 28 by the latter being forced, with multiple tons of pressure, against the blade 70, causes the cut edges of the segments 80 to be rendered wavy as at 82 with the crests and troughs of the wavy edge 82 being disposed, generally, in the plane of the blade 70. Furthermore, the wedging action of the wedge-type blade 70 on the pipe section 28 renders the pipe segments 80 arcuate in a plane disposed normal to the cutting blade 70, all of which deformation of the pipe segments 80 serves to substantially totally loosen the buildup of magnesium from the inner surfaces of the pipe segments 80 so that the pipe segments 80 and the loosened buildup 82 of magnesium fall separately upon a conveyor 86 for conveyance therealong toward a pair of bins 88 and 90 into which the magnesium and pipe segments, respectively, are discharged, the outlet end of the conveyor including magnetic means (not shown) for separating the ferrous pipe segments 28 from the magnesium 82. As the pipe sections 80 fall onto the conveyor 86, the segments 80 are vibrated to further loosen any buildup 82 of magnesium remaining on the segments 80.

Of course, once the pipe segments 80 and magnesium 82 have been separately deposited into the bins 88 and 90, further action to reclaim both the magnesium and the metal of the pipe segments 80 may be carried out in conventional manners.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. The method of removing hardened mineral material buildup from the interior of a pipe section constructed of bendable material, said method including the steps of forming cuts through a plurality of circumferentially spaced wall portions of said pipe section along and for the full length of said pipe section from one end thereof to the other end with said cuts lying generally along radii of said pipe section, thereby forming cut segments of said pipe section, and thereafter vibrating the cut segments of said pipe section, thereby loosening therefrom any material buildup remaining clinging thereto.

2. The method of claim 1 wherein said cuts are simultaneously formed.

3. The method of claim 2 wherein said cuts are made by forcing said pipe section lengthwise along wedge-type cutting blade portions, with said blade portions disposed generally along radii of said pipe section, and a wedging action of said blade portions on said pipe section causing deformation of the longitudinal edges of said cut segments to the extent that said longitudinal edges have waves formed therealong, the deformation of said longitudinal edges serving to loosen and break the mineral buildup from the cut segments.

4. The method of claim 3 wherein said cuts are formed generally along coextensive radii of said pipe sections.

5. The method of claim 4 wherein the wedging action on said pipe sections, during the cutting action on said pipe section is sufficient to bend said pipe sections at the point of cutting outwardly from the center axis of said pipe section, thereby further loosening said mineral buildup from said pipe segments.

6. The method of removing hardened mineral material buildup from the interior of a pipe section constructed of bendable material, said method including the steps of forming cuts through a plurality of circumferentially spaced wall portions of said pipe section along and for the full length of said pipe section from one end thereof to the other end, with said cuts lying generally along radii of said pipe section, thereby forming cut segments of said pipe section, said cuts being made by forcing said pipe section lengthwise along wedge-type cutting blade portions, with said blade portions disposed generally along radii of said pipe section, a wedging action of said blade portions on said pipe section causing deformation of the longitudinal edges of said cut segments to the extent that said longitudinal edges have waves formed therealong, the deformation of said longitudinal edges serving to loosen and break the mineral buildup from the cut segments.

* * * * *